US 011225010B2

(12) United States Patent
Largerie

(10) Patent No.: US 11,225,010 B2
(45) Date of Patent: Jan. 18, 2022

(54) DEVICE FOR PRODUCING CONTAINERS PROVIDED WITH DECORATIVE WRAPPERS

(71) Applicant: ERCA, Les Ulis (FR)

(72) Inventor: Michel Largerie, Barcelona (ES)

(73) Assignee: ERCA, Les Ulis (FR)

( * ) Notice: Subject to any disclaimer, the term of this patent is extended or adjusted under 35 U.S.C. 154(b) by 170 days.

(21) Appl. No.: 16/606,569

(22) PCT Filed: Apr. 24, 2018

(86) PCT No.: PCT/FR2018/051030
§ 371 (c)(1),
(2) Date: Oct. 18, 2019

(87) PCT Pub. No.: WO2018/197806
PCT Pub. Date: Nov. 1, 2018

(65) Prior Publication Data
US 2020/0180206 A1  Jun. 11, 2020

(30) Foreign Application Priority Data
Apr. 26, 2017 (FR) ...................... 1753642

(51) Int. Cl.
*B29C 51/16* (2006.01)
*B29C 33/14* (2006.01)
*B29L 31/00* (2006.01)

(52) U.S. Cl.
CPC ............ *B29C 51/167* (2013.01); *B29C 33/14* (2013.01); *B29L 2031/712* (2013.01)

(58) Field of Classification Search
CPC ...... B29C 51/167; B29C 51/165; B29C 33/14
See application file for complete search history.

(56) References Cited

U.S. PATENT DOCUMENTS 4,130,386 A * 12/1978 Hautemont ........... B29C 51/165
    249/136
4,134,717 A *  1/1979 Philippon ............. B29C 51/167
    425/292

FOREIGN PATENT DOCUMENTS

CN      1659009 A    8/2005
CN    101837636 A    9/2010
(Continued)

OTHER PUBLICATIONS

Office Action issued in Chinese Patent Application No. 201880028079.5, dated Mar. 2, 2021, 5 pages.
(Continued)

*Primary Examiner* — Robert B Davis
(74) *Attorney, Agent, or Firm* — Eversheds Sutherland (US) LLP

(57) ABSTRACT

The device comprises at least one forming and wrap-around labeling assembly (60) suitable for taking up an active configuration in which said assembly has a forming chamber (36) and a looping chamber (46), which chambers are in axial alignment and communicate with each other via an annular passageway (62) provided through the end wall of the forming chamber. The assembly is further provided with a pusher member (66) configured to push a wrap-around label (27) that is looped in the looping chamber into the forming chamber. At least one portion (36C') in the forming chamber (36) flares going away from the end wall (36B) of the forming chamber and the pusher member is configured to expand radially while pushing the wrap-around label (26A) into said flared portion (36C') of the forming chamber (36).

12 Claims, 10 Drawing Sheets

(56) References Cited

FOREIGN PATENT DOCUMENTS

| | | |
|---|---|---|
| CN | 105377519 A | 3/2016 |
| DE | 2703327 | 8/1977 |
| DE | 10011386 A1 | 9/2000 |
| EP | 0249550 A1 | 12/1987 |
| FR | 2499899 | 8/1982 |
| FR | 2793185 | 11/2000 |
| JP | 0550531 | 3/1993 |

OTHER PUBLICATIONS

Foulger, Caroline—International Search Report dated Jul. 3, 2018.

* cited by examiner

DEVICE FOR PRODUCING CONTAINERS PROVIDED WITH DECORATIVE WRAPPERS

CROSS-REFERENCE TO RELATED APPLICATIONS

This application is a National Stage of International Application No. PCT/FR2018/051030, filed Apr. 24, 2018, which claims priority to French patent application 1753642, filed Apr. 26, 2017, each of which is incorporated by reference.

The present specification relates to a device for manufacturing containers provided with decorative wrap-around labels or "banderoles", the device comprising at least one forming and wrap-around labeling assembly suitable for taking up an active configuration in which said assembly has a forming chamber and a looping chamber, which chambers are in axial alignment and communicate with each other via an annular passageway provided through the end wall of the forming chamber, the forming and wrap-around labeling assembly further being provided with a pusher member configured to push a wrap-around label that is looped in the looping chamber into the forming chamber.

Devices of this type are known, for example from Documents FR 2 793 185 and FR 2 839 465. In those devices, for each forming and wrap-around labeling assembly, the looping chamber is disposed under the forming chamber and communicates therewith via the end wall of said forming chamber. A wrap-around label can thus be looped in the looping chamber without that looping increasing the overall process time, i.e. simultaneously while a container body is being formed in the forming chamber situated above, to which forming chamber a wrap-around label that was previously disposed in the looping chamber has been transferred. Once the body of the container that is provided with that wrap-around label has been formed, another wrap-around label is thus standing by in the looping chamber. The container body is then unmolded from the forming chamber and, at the same time, the wrap-around label standing by is put into position in the forming chamber so as to adhere to the body of a new container that is to be formed in said forming chamber. Those devices are generally satisfactory and have been the subjects of various improvements and variants concerning the looping and the positioning of the wrap-around label in the looping chamber and then in the forming chamber. In particular, Document FR 2 793 185 focuses on the sequencing of the looping, of the transfer, and of the forming, so that each sequence takes place while another sequence is taking place, thereby reducing the time taken by the process overall, while Document FR 2 839 465 recommends using a drive wheel to facilitate looping the wrap-around label properly in the looping chamber.

In general, once the wrap-around label has reached the correct position in the forming chamber, it can be held in that position, e.g. by suction that presses it against the side wall of said chamber. However, the difficulty lies in bringing the wrap-around label into the desired position in the forming chamber.

When said forming chamber is of cylindrical shape, with constant diametrical dimensions, it is conventional to insert the wrap-around label via the end wall of said chamber and, using transfer means that are moved in vertical translation, to push said wrap-around label until it reaches the desired position.

Conversely, if the forming chamber is flared, i.e. if it has at least one portion in which its diametrical dimensions increase going away from its end wall, it is difficult to put the wrap-around label in place starting from the end wall of the chamber.

In particular for this reason, other devices exist, in which the wrap-around label is put in place in the forming chamber via the forming opening that is opposite from the end wall of the said chamber. Such a device is, in particular, described in Document FR 2 965 506. For making simultaneous-sequence operation possible for reducing overall process time, use is made of a tilting mold that has at least two series of forming chambers, so that the wrap-around labels can be inserted via the forming openings of one series of forming chambers, which are then in the tilted position, while the forming chambers of the other series are serving to form containers.

This makes it possible to push a wrap-around label into each forming chamber by pushing the wrap-around label via the forming opening (i.e. the opening via which the forming piston is to be inserted), until the rear edge of the wrap-around label, which edge is the closer to the end wall of the forming chamber, has reached the desired position. Thus, when only the end portion of the forming chamber is flared, it is possible, without any difficulty, to insert the wrap-around label via the forming opening while holding it in the cylindrical portion of the chamber, which portion is situated between the flared portion and the forming opening, i.e. with the rear edge of the wrap-around label being situated substantially at the level where the flared portion ends.

That device is also satisfactory, but it is somewhat complex because it requires various different series of forming chambers to be manufactured and used, and it requires the forming to be timed to match the tilting of said series of chambers.

An object of the present invention is to further improve the above-mentioned state of the art, by proposing a simple device making it possible to dispose a wrap-around label in a forming chamber that has at least one flared portion.

Thus, the present specification provides a device for manufacturing containers provided with decorative wrap-around labels or "banderoles", the device comprising at least one forming and wrap-around labeling assembly suitable for taking up an active configuration in which said assembly has a forming chamber and a looping chamber, which chambers are in axial alignment and communicate with each other via an annular passageway provided through the end wall of the forming chamber, which end wall is opposite from a forming opening in the forming chamber, the forming and wrap-around labeling assembly further being provided with a pusher member configured to push a wrap-around label that is looped in the looping chamber into the forming chamber through the annular passageway; in this device, at least one portion of the forming chamber flares going away from the end wall towards the forming opening and the pusher member is configured to expand radially while pushing the wrap-around label into said flared portion of the forming chamber.

After the wrap-around label has been looped in the looping chamber, the lower edge of said wrap-around label is carried by the pusher member. The wrap-around label is transferred to the forming chamber while the pusher member and the forming chamber are moving relative to each other, the transfer being achieved by the wrap-around label being pushed into the forming chamber through the annular passageway. The annular passageway is provided through the end wall of the forming chamber, opposite from the forming opening that is provided for enabling a thermoforming piston to pass through it. At the beginning of this relative movement, the pusher member is situated in the end-wall region of the forming chamber, which region is of small diametrical dimensions, and said pusher member therefore itself defines small diametrical dimensions. During the above-mentioned relative movement in translation, the pusher member advances through the flared portion of the forming chamber, the diametrical dimensions of which flared portion increase going away from the end wall, and, due to the pusher member expanding, it itself defines diametrical dimensions that increase.

For example, in order to push the wrap-around label into the forming chamber, the pusher member has a pushing surface that extends transversely to the axis of alignment of the forming chamber and of the looping chamber, which surface is configured to carry an edge of the wrap-around label. This edge is situated in a plane transversal to the alignment axis. In particular, this pushing surface is provided on the upper end of the pusher member, on which end the lower edge of the wrap-around label rests.

As it penetrates into the flared portion of the thermoforming chamber, the pusher member expands, i.e. the diametrical dimensions of the pushing surface it defines that is carrying the wrap-around label increase relative to the dimensions the same pushing surface had while it was still outside the thermoforming chamber. By advancing along the flared portion of the thermoforming chamber, the pusher member thus goes into an expanded configuration; it returns to its retracted configuration on coming back out of said chamber.

Thus, the lower edge of the wrap-around label is carried by the pusher member, without any risk of becoming jammed between the pusher member and the side wall of the forming chamber, since the expansion of the pusher member makes it possible to avoid creating an annular gap between the outer side edge of said member and the side wall of the forming chamber.

Optionally, the pusher member includes resilient means urging said pusher member continuously in the direction in which it expands radially, and, when the forming and wrap-around labeling assembly is in the active configuration, said pusher member is constrained in radial compression by the side wall of the looping chamber against the return urging effect of said resilient means.

Optionally, the forming and wrap-around labeling assembly further comprises a shaping core that carries the pusher member and that, in the active configuration, co-operates with the facing wall of the looping chamber to define an annular looping space, the shaping core and the side wall of the forming chamber being suitable for being moved axially relative to each other so as to push the wrap-around label into the forming chamber.

Optionally, the pusher member comprises an expandable ring, which, for example, comprises a split ring.

Optionally, the pusher member comprises a plurality of pusher fingers.

Optionally, the pusher fingers are carried by a common support while being suitable for moving radially relative to said common support.

Optionally, the pusher fingers are mounted to pivot on the common support.

Optionally, the pusher fingers co-operate with springs urging said fingers radially outwards.

Optionally, when the forming and wrap-around labeling assembly has a shaping core, the pusher fingers are carried by the shaping core.

Optionally, at least one of the elements comprising the pusher member and the annular passageway has a retractor ramp that, when the pusher member comes to co-operate with the radially outer edge of said annular passageway while the pusher member and the wall of the forming chamber are moving relative to each other in the direction opposite from the direction in which the wrap-around label is pushed into the forming chamber, is suitable for urging said pusher member in the direction opposite from the direction in which it expands.

It can be understood that a device in accordance with the present specification is particularly simple because, while a wrap-around label is being pushed into the forming chamber, the pusher member undergoes expansion that avoids any jamming of the wrap-around label and ensures that the lower edge of said wrap-around label is positioned properly up to the desired position in the forming chamber. Expansion of the pusher member while a wrap-around label is being pushed, and retraction of the pusher member in a reverse movement may be automatic. The pusher member may be constituted by a single element, in particular by an expandable ring, or else it may be constituted by a plurality of elements, e.g. pusher elements, as mentioned above.

The present specification can be well understood on reading the following detailed description of embodiments, given by way of example and with reference to the accompanying drawings, in which.

Figure 1:
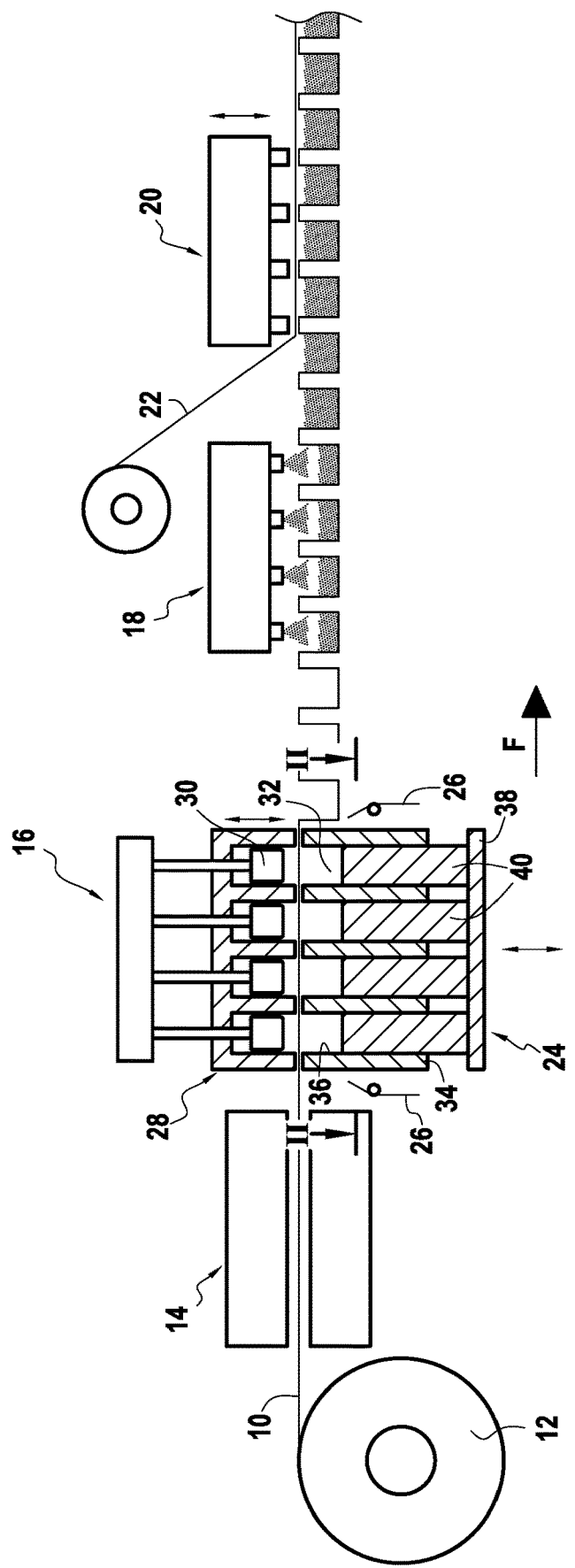
FIG. 1 is an overall view of an installation for thermoforming containers, and for filling and sealing said containers.

The installation shown in FIG. 1 comprises a plurality of stations through which a sheet 10 of thermoplastic material is driven stepwise, the sheet being unreeled from a reel 12. Considered in succession in the direction of advance F of the sheet, the installation comprises a heater station 14, a thermoforming station 16 for thermoforming the containers, a filler station 18 for filling the thermoformed containers, and a closure station 20 for closing the filled containers by sealing a closure sheet 22 across their openings.

In manner known per se, the thermoforming station 16 comprises a substation 24 of thermoforming chambers and of looping chambers for looping wrap-around labels (obtained from the strips 26) in the thermoforming chambers, and a block 28 of thermoforming pistons 30 that can be moved back and forth in said chambers.

In the present specification, it is considered, by way of example, that the plane in which the sheet 10 is driven is horizontal and that the block 28 of thermoforming pistons is situated above that plane, while the mould block is situated below it, so that the thermoforming movement of the pistons takes place vertically downwards. For reasons of simplicity, reference is made to the vertical direction for designating the thermoforming direction. Similarly, the terms "above" and "below", and "upper" and "lower" should be understood relative to the thermoforming direction. Naturally, this is merely one example, and the thermoforming may take place vertically upwards if the mold block is above the block of pistons, or in other directions, depending on the direction of alignment of the two blocks. In addition, the terms "inner" and "outer" should be understood relative to the thermoforming axis, an inner element being closer to that axis than an outer element.

The substation 24 comprises a mold block 34 in which rows of thermoforming chambers 36 are provided. For the thermoforming, the pistons 30 move in the thermoforming chambers 36, and push into them the thermoplastic material of the sheet 10 previously heated in station 14. In this example, since the sheet 10 is moved horizontally and since the pistons 30 are disposed above said sheet, the thermoforming chambers 36 are provided in the upper portion of the mold block 34. The substation 24 further comprises a block 38 of looping mandrels that carries as many looping mandrels 40 as the mold block 34 has thermoforming chambers, a mandrel being disposed in each thermoforming chamber from the lower end of the mold block 34. Each looping mandrel forms a shaping core around which a wrap-around label can be looped.

The ends of the strips 26 are fed into the looping chambers, and cut and looped in said chambers around the looping mandrels 40 for the purpose of forming wrap-around labels. Those wrap-around labels are then transferred to the thermoforming chambers 36 by the mold block 34 being moved in translation relative to the looping mandrels 40. For example, the mandrels are not moved in translation, whereas the mold block 34 is movable vertically back and forth between a thermoforming high position and an unmolding low position.

Figure 2:
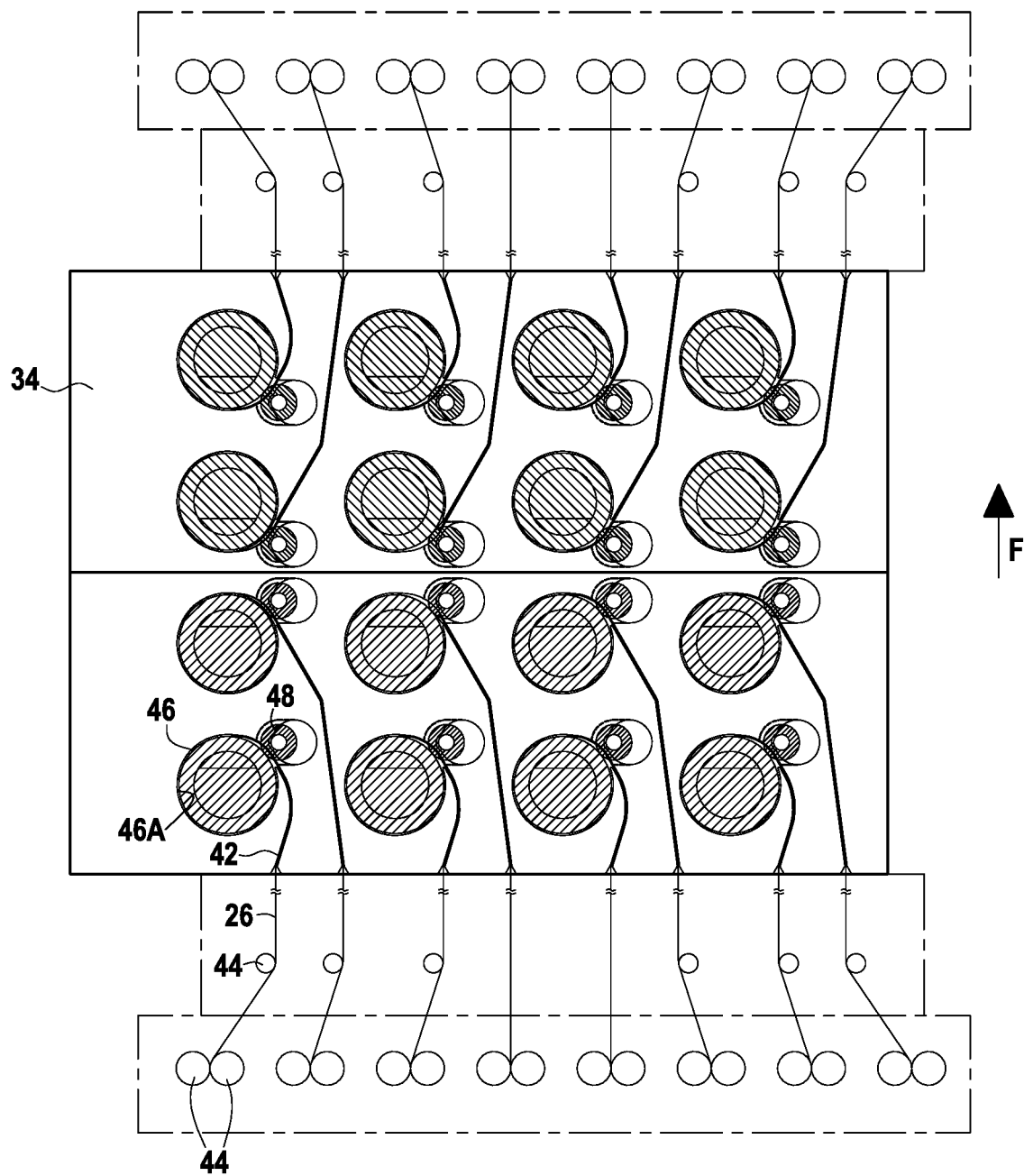
FIG. 2 is a diagrammatic section view on the plane II-II of FIG. 1, showing organization of the looping device for looping wrap-around labels that are to be transferred to the thermoforming chambers, for performing wrap-around labeling of the containers thermoformed in said chambers.
Figure 3A:
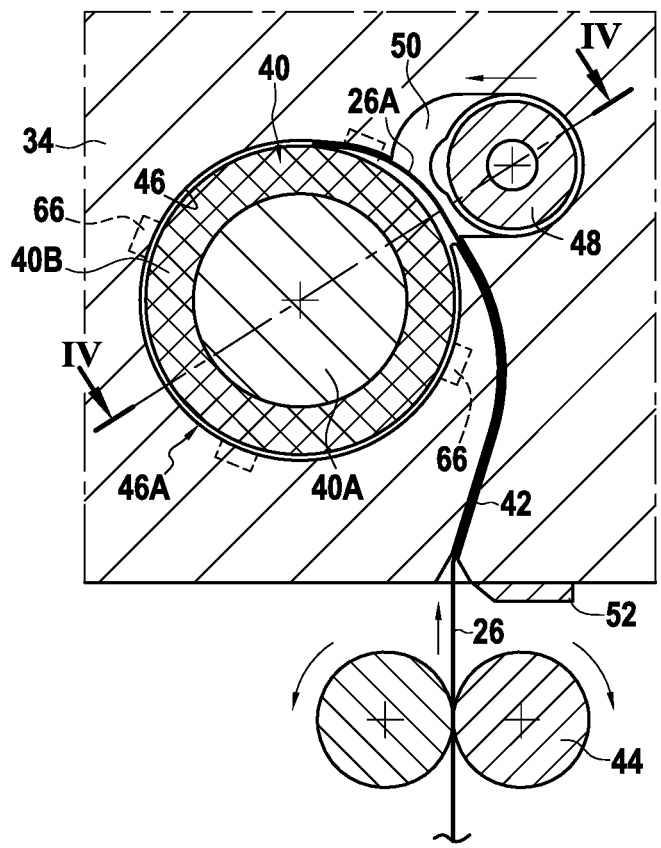
FIGS. 3A and 3B show two successive states for a looping device, in section views corresponding to the section view of FIG. 2.
Figure 3B:
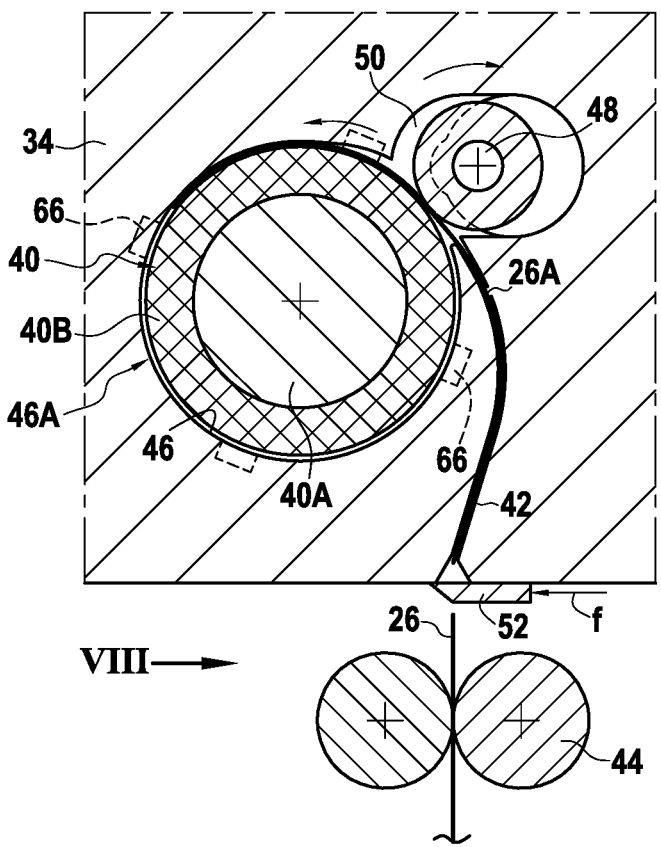

With reference to FIGS. 2, 3A, and 3B, a description follows of how wrap-around labels are looped in the looping chambers situated in the low portion of the mold block 34. In this example, the block 34 comprises four rows of forming and looping units, each unit comprising a forming chamber 36 (see FIG. 1) and a looping chamber 46, which chambers are mutually superposed, the four rows being disposed in succession in the direction of advance F of the thermoplastic sheet. For each looping chamber 46, a strip 26 is fed to an inlet slot 42 in the looping chamber by being driven by drive rollers 44. The leading end of the strip 26, pushed by the rollers 44, is pushed into the slot 42 until it reaches the looping chamber proper 46. In the example shown, for each looping chamber 46, the looping device has a mandrel 40 disposed in the chamber 46 in such a manner as to co-operate therewith to define an annular space 46A in which the wrap-around label can be looped.

As in Document FR 2 839 465, and in this example, the device further comprises a drive wheel 48 disposed in a side space 50 communicating with the looping chamber 46. Said drive wheel 48 has a vertical axis of rotation, the vertical direction being the direction of movement of the thermoforming pistons and the direction in which the looping mandrel 40 extends.

As can be seen in FIG. 3A, when the leading end 26A of a strip 26 is inserted into a looping chamber 46, the drive wheel 48 is initially spaced apart from the looping mandrel 40, until the free end of the leading end portion 26A has been pushed far enough through the slot 42 to have gone past the drive wheel 48. Once the desired length of strip has been inserted through the slot 42 and into the chamber 46, a blade 52 is actuated to cut the strip, the leading portion 26A thereby forming a segment that, once looped, constitutes a wrap-around label.

In FIG. 3B, the drive wheel 48 has moved in such a manner as to come closer to the looping mandrel 40, until the end portion 26A of strip is nipped between said mandrel and said drive wheel. The drive wheel is driven in rotation in such a manner as to loop the segment of strip around the looping mandrel 40. This mandrel 40 may be stationary and have a low-friction surface facilitating the progress of the strip segment. As in the example shown, the mandrel 40 may also have a stationary core 40A around which a ring 40B is mounted to be freely rotatable. Thus, the drive wheel 48 rotating facilitates the rotation of the ring 40B and the looping of the strip segment.

Generally, the drive wheel device 48 and the sequence in which it is used may be of the type described in Patent Application FR 2 839 465, to which reference may be made to supplement the present specification.

However, it should be understood that other means for looping wrap-around labels in the looping chambers may be provided without going beyond the ambit of the present specification, e.g. without looping mandrels or without drive wheels.

Furthermore, FIG. 1 shows thermoforming from a sheet of thermoplastic material driven stepwise, but it should be understood that the present specification is also valid for manufacturing by thermoforming, or more generally by forming, from wafers or tokens or from panels, each corresponding to one container or to a group of containers.

In the present specification, the terms "forming" and "thermoforming" are used interchangeably, thermoforming being one particular example of forming, achieved with a thermoplastic material that is heated prior to the forming.

Figure 4A:
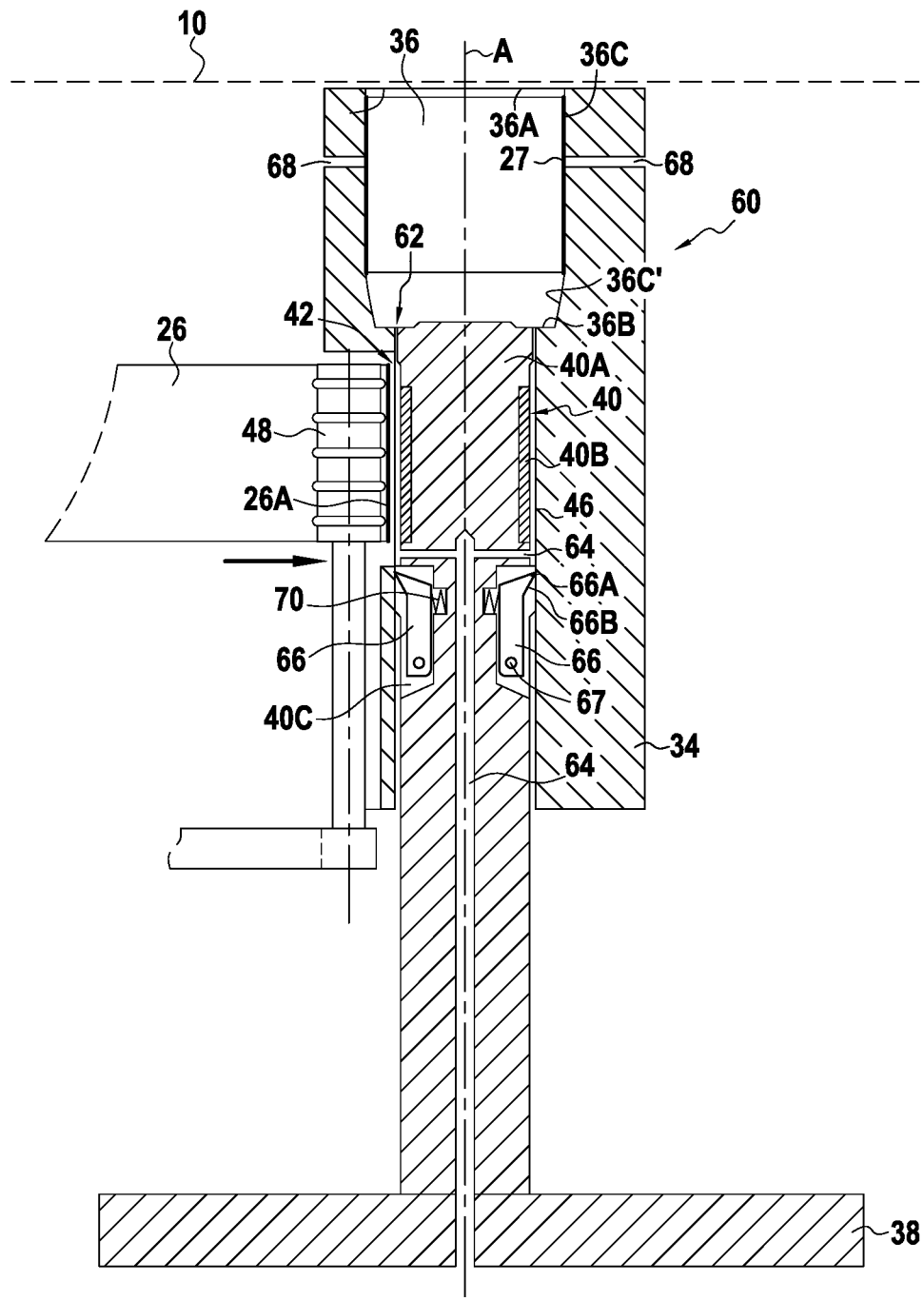
FIGS. 4A to 4E show five successive states for a forming and wrap-around labeling assembly, in section views corresponding to the plane IV-IV of FIG. 2.

With reference to FIGS. 4A to 4E, a description follows of a forming and wrap-around labeling assembly 60, and of the sequence in which it is used. Said assembly 60 comprises a thermoforming chamber 36 and a looping chamber 46 that are provided in the block 34 and that are aligned axially on the thermoforming axis A, which is vertical in this example. In this example, since the thermoforming takes place by the thermoforming pistons moving downwards, the looping chamber 46 is disposed under the thermoforming chamber 36. The forming chamber 36 is provided with an upper forming opening 36A through which the thermoforming piston can move so as to push the thermoplastic material 10, with an end wall 36B opposite from the opening 36A, and with a side wall 36C that extends between the opening 36A and the end wall 36B. In this example, the end wall 36B is defined by the head of the mandrel 40 that is disposed in the looping chamber 46. It can be seen that the looping chamber 46 communicates with the thermoforming chamber 36 via an annular passageway 62 that is provided through the end wall of the thermoforming chamber. Since the section view of FIG. 4A is on an axial plane including a diameter intersecting the axis of the drive wheel 48, the wall of the mold block 34 is interrupted at that place. In FIG. 4A, the drive wheel 48 is in the position in which it is spaced apart from the looping mandrel 40. The block 34 is in its high position so as to enable a container body to be thermoformed. A wrap-around label 27 that has previously been cut off from the end of the strip 26 is present in the thermoforming chamber 36. While a container body is being thermoformed in the chamber 36 as equipped with the wrap-around label 27, the new end of the strip 26 is pushed into the slot 42 by above-mentioned rollers 44. The drive wheel 48 is therefore then spaced apart from the looping mandrel 40.

Figure 4B:
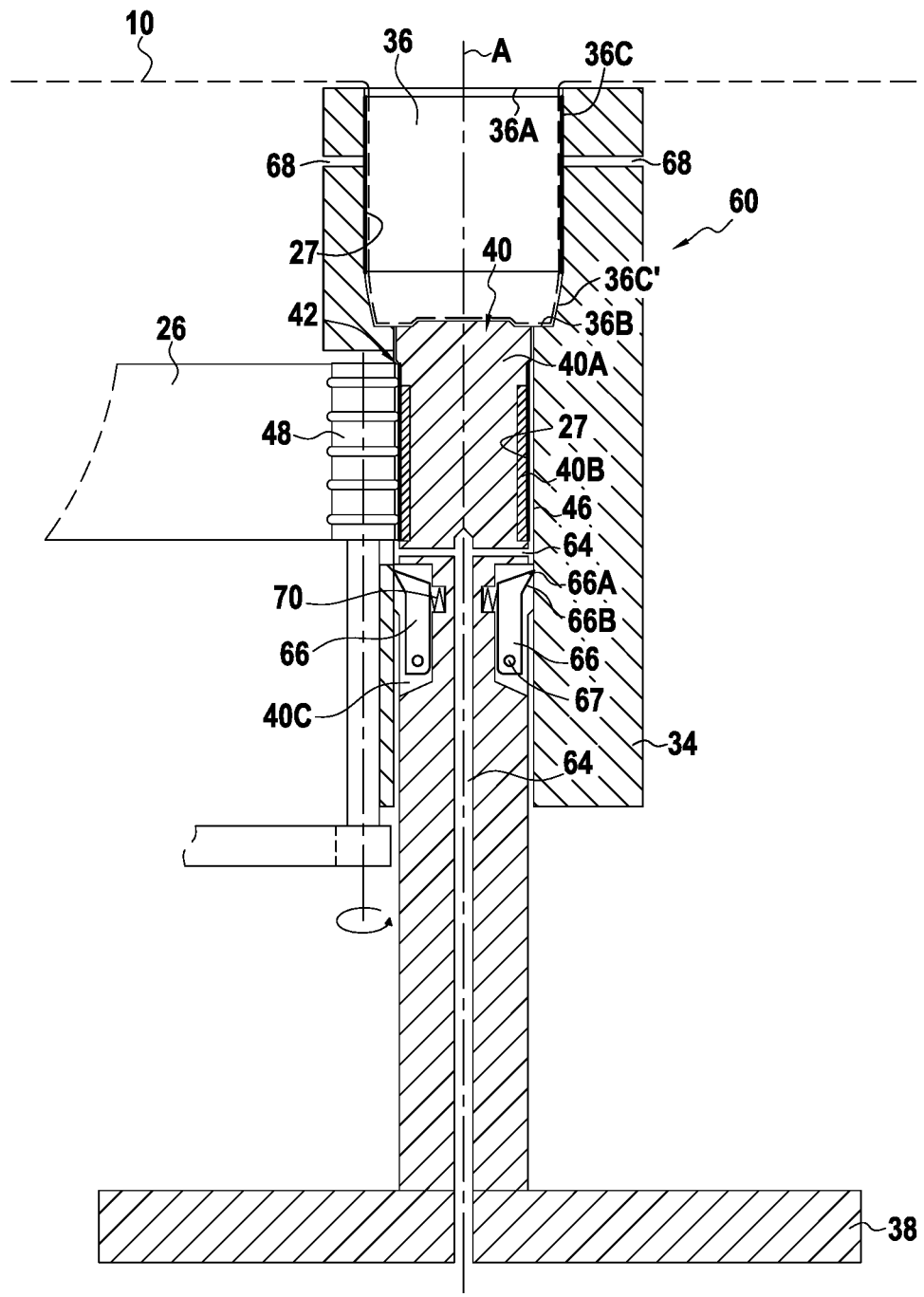

In FIG. 4B, the drive wheel 48 has been moved towards the looping mandrel 40 in such a manner as to nip said new end of strip against said mandrel. Thus, while a container is being formed in the chamber 36, the drive wheel 48 can be driven in rotation so as to loop the new end of strip in the looping chamber 46. After these simultaneous operations of thermoforming and of looping the new end of a strip, a container provided with a wrap-around label is thus found thermoformed in the chamber 36, while a new wrap-around label 27 is thus found standing by in the looping chamber 46.

Figure 4C:
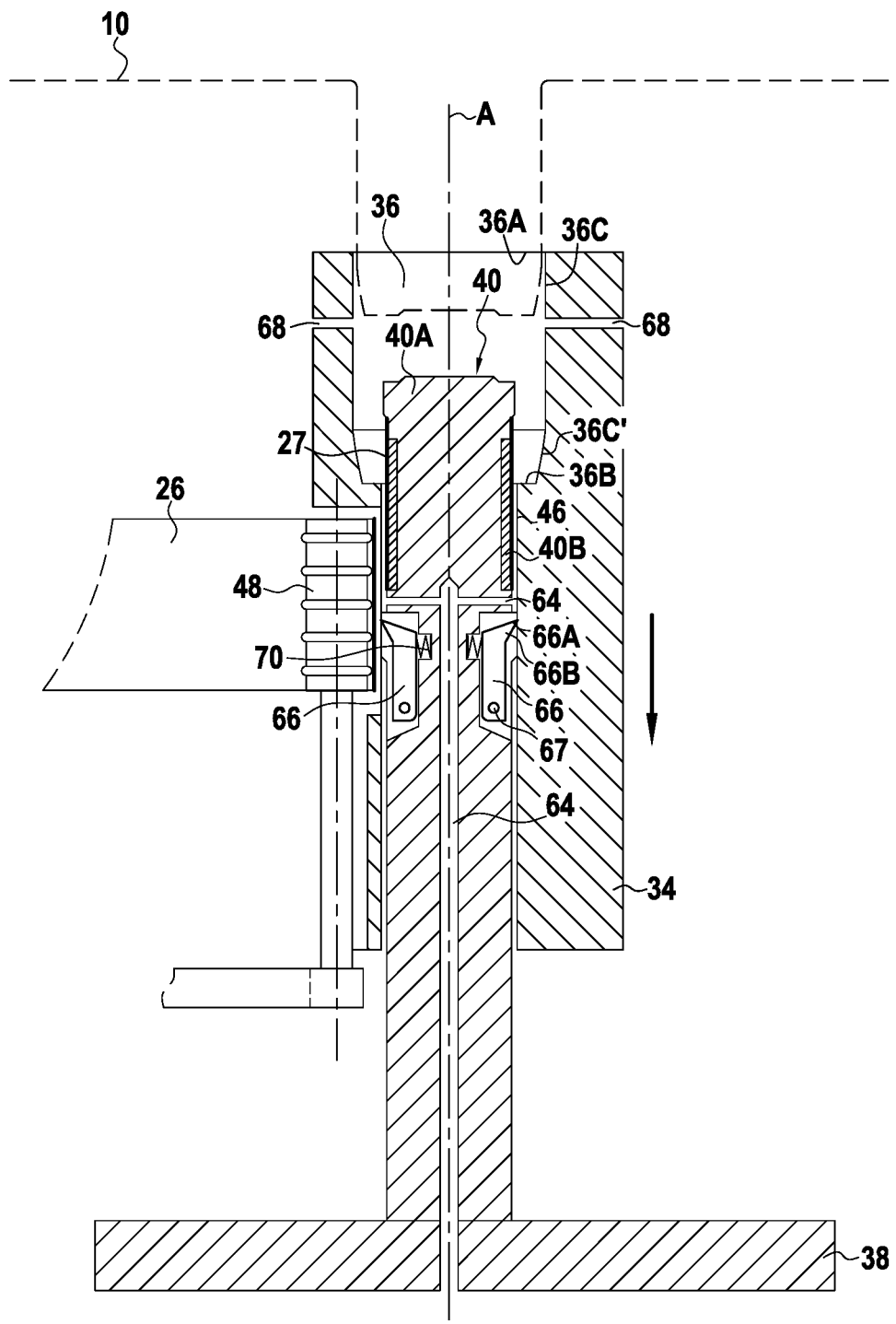

It is then necessary to unmold the container body and to transfer the new wrap-around label to the thermoforming chamber 36. To achieve this, the block 34 is moved in such a manner as to move away from the plane of the thermoplastic sheet 10, i.e. downwards, as shown in FIG. 4C. Naturally, prior to this, the drive wheel 48 has been moved away from the looping mandrel 40.

Optionally, during this movement, in order to facilitate holding the wrap-around label 27 looped around the looping mandrel 40, said mandrel may be equipped with channels 64 connected to suction and opening out in its side wall, in such a manner that the wrap-around label 27 that is standing by can be pressed against said mandrel. When the mandrel is so equipped, the suction source has been activated while the mold block 34 is being lowered.

The device further comprises pusher fingers 66 that, in this example, are carried by the mandrel 40, which constitutes an example of a common support for said pusher fingers. In other words, the common support may be made in one piece with the looping mandrel, as it is in this example, or it may be an element that is dissociated from said mandrel.

For transferring the wrap-around label 27 to the thermoforming chamber 36, the relative movement between the looping mandrel 40 and said thermoforming chamber 36 that, in this example, takes place by lowering the block 34 while the mandrel remains stationary, is performed until that portion of side wall 36C of the chamber 36 in which the wrap-around label should be situated comes into register with the wrap-around label 27 looped around the mandrel 40.

During this relative movement, the upper ends of the pusher fingers 66 co-operate with the lower edge of the wrap-around label 27 so as to push it into the desired position in the thermoforming chamber 36.

In this example, this chamber 36 has a flared portion 36C', in which the diametrical dimensions of its side wall 36C increase going away from the end wall. In this example, seen in section in a plane including the vertical axis A of the chamber, this flared portion 36C' forms a slightly rounded curve until it joins up tangentially with the vertical direction.

Figure 4D:
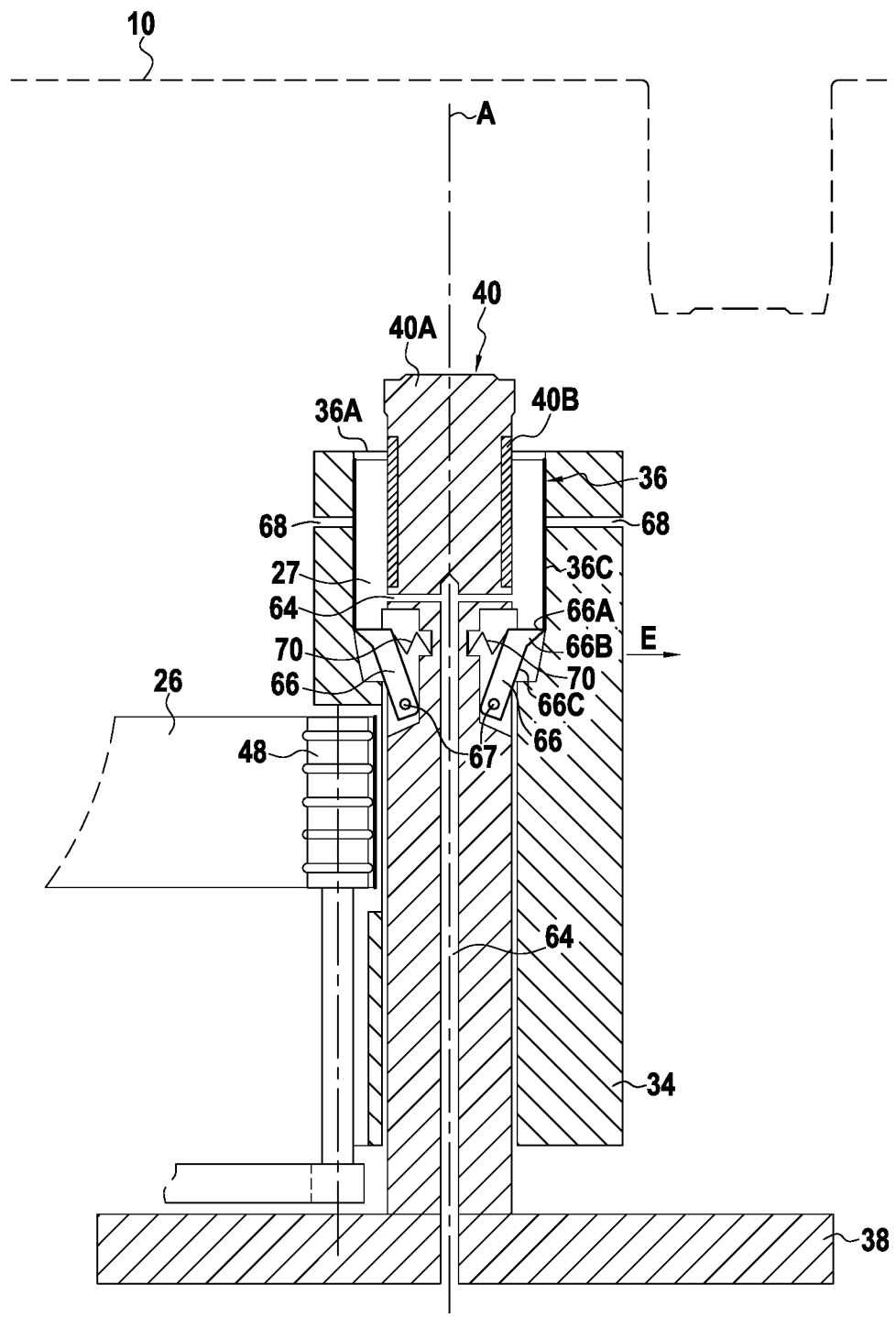

By comparing FIGS. 4C and 4D, it can be seen that the pusher fingers 66 are configured to expand radially, thereby pushing the wrap-around label 27 into the flared portion 36C' of the thermoforming chamber 36. More precisely, the pusher fingers initially take up a retracted position, in which they remain constrained during a first stage of lowering of the block 34, by them co-operating with the wall of the looping chamber 46. Thus, the fingers 66 remain in their retracted configuration while a wrap-around label is being looped in said chamber 46 and during the beginning of the unmolding of a container formed in the chamber 36. However, when the mold block 34 reaches the low level in which the upper ends of the fingers are situated in the flared portion 36C' of the thermoforming chamber 36, said fingers naturally come to expand, thereby carrying the lower end of the wrap-around label 27 as shown FIG. 4D.

Once the mold block 34 has reached the desired low position, i.e. once the wrap-around label 26A has reached the desired level inside the chamber 36, a reverse movement of the mold block 34 is triggered, so that it can then go back up.

The device is optionally provided with suction channels 68 that open out in the main portion of the side wall 36C of the thermoforming chamber 36, in which portion the wrap-around label 27 is situated. When the suction via said channels is activated, the wrap-around label is pressed against the side wall 36C, and this is a possible manner of contributing to holding the wrap-around label in position while the mold block 34 is going back up.

Figure 4E:
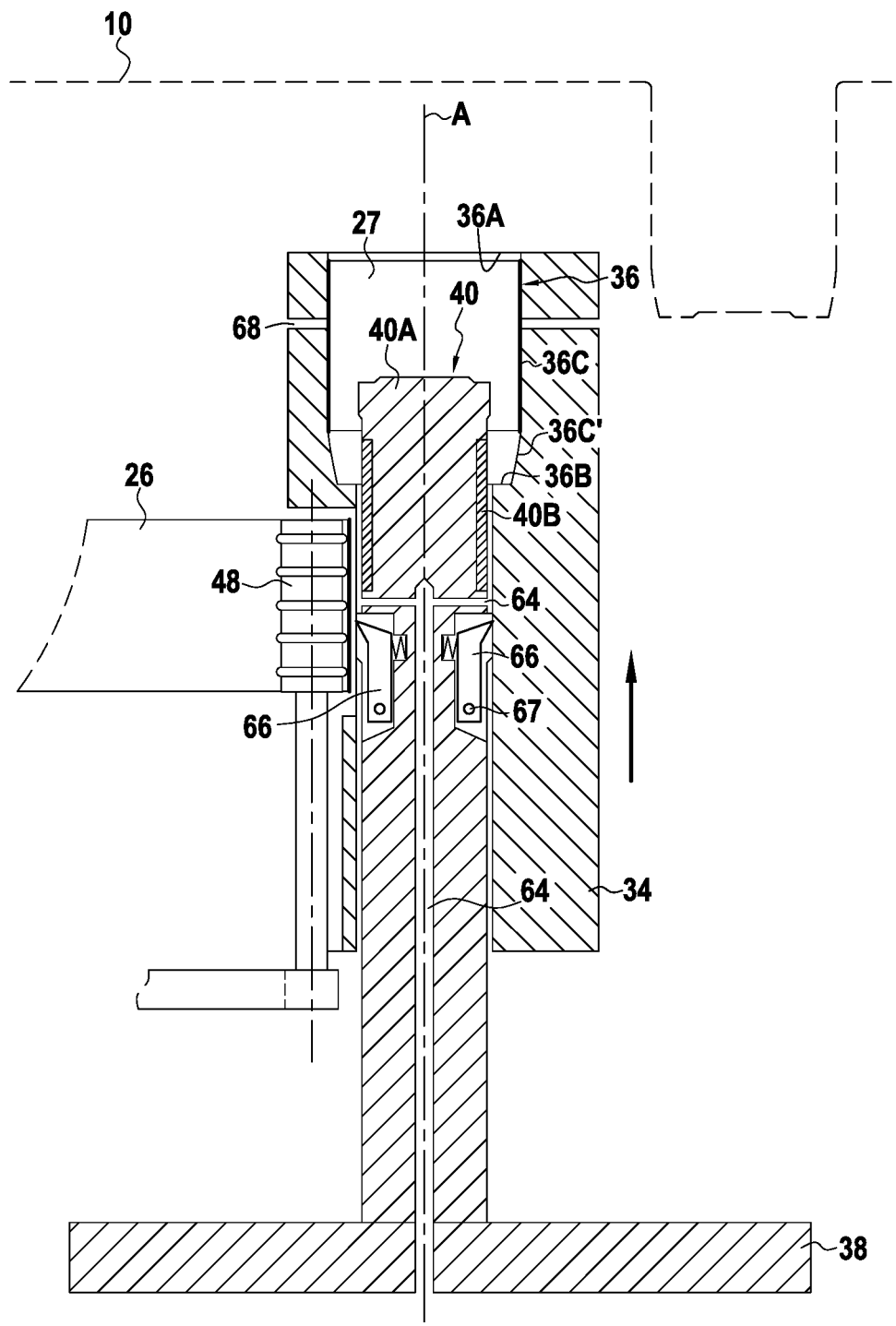

FIG. 4E shows the mold block 34 going back up, and taking the wrap-around label 27 in the chamber 36 with it. During this upward movement, the fingers 66 naturally resume their retracted position.

In the meaning of the present specification, the fingers 66, as considered together, constitute an example of a pusher member. Said fingers have pushing surfaces provided at their upper ends 66A and on which the lower edge of the wrap-around label rests while it is being pushed by the fingers into the forming chamber.

It can be seen that the pusher fingers 66 are continuously urged by springs 70 in the directions in which they expand radially. In this example, each pusher finger is hinged, by being mounted to pivot on the mandrel 40. More precisely, each finger 66 is mounted on the mandrel 40 via a pivot axis 67 disposed at the lower end of the finger 66, the pivot axis 67 being horizontal in this example. Conversely, the springs 70 are disposed towards the upper ends 66A of the fingers 66. In this example, each finger 66 is disposed in a setback 40C in the mandrel 40 that, when the mold 34 is in the high position, is situated under the looping chamber 46. The springs 70 are disposed in recesses provided in the end walls of said setbacks, in such a manner as to co-operate with the radially inner faces of the pusher fingers, i.e. their faces facing towards the axis A. Thus, the spring co-operating with each finger tends to push it in the direction E in which it expands, by pivoting about the axis 67.

In the expanded position, the upper ends 66A of the fingers 66 project radially outwards relative to the outer surface of the mandrel 40. It can be seen that, in the regions of their upper ends 56A, the outer side surfaces of said fingers have retractor ramps 66B that slope towards the axis A while going towards the lower ends of the fingers. Thus, while the block 34 is moving back up from the low position shown in FIG. 4D, said ramps 66B co-operate with the outer edge of the annular passageway 62 provided through the end wall of the chamber 36 so as to bring the fingers naturally into their retracted position.

It should be noted that the upper end portions of the pusher fingers 66 form outwardly extending spurs, the lower faces of which spurs form the above-mentioned retractor ramps 66B. These spur shapes facilitate rapid pivoting of the fingers in the directions in which they expand, as soon as the end wall 36B of the thermoforming chamber reaches the level at which the fingers are situated, while the mold block is being lowered. The upper face of each finger has an overhanging portion above the tip of the spur, which portion can extend into contact with the side wall of the thermoforming chamber, or into the immediate vicinity of said side wall, while tilting of the finger is limited by the main portion 66C of its outer face co-operating with the outer edge of the annular passageway 62.

FIGS. 4A to 4E show two fingers 66 that are diametrically opposite. In order to avoid the risks of the lower edge of the wrap-around label tilting about the diametrical line between the two fingers, it is advantageous to provide at least three angularly spaced apart fingers, or indeed four angularly spaced apart fingers. It should also be noted that, to make the drawings clearer, the drive wheel 48 and a pusher finger 66 are shown in the interruption in the wall of the mold block 34 and a second pusher finger is shown in the section plane. However, as can be seen in FIGS. 3A and 3B, in which the positions of the fingers are indicated in dashed lines, provision is made to avoid disposing a finger in the region in which the wall of the mold block 34 is interrupted, so that the fingers can bear continuously against the wall of the looping chamber 46, so long as they are not in the thermoforming chamber. Thus, the fingers 66 are not in the same section plane as the drive wheel 48.

Figure 5:
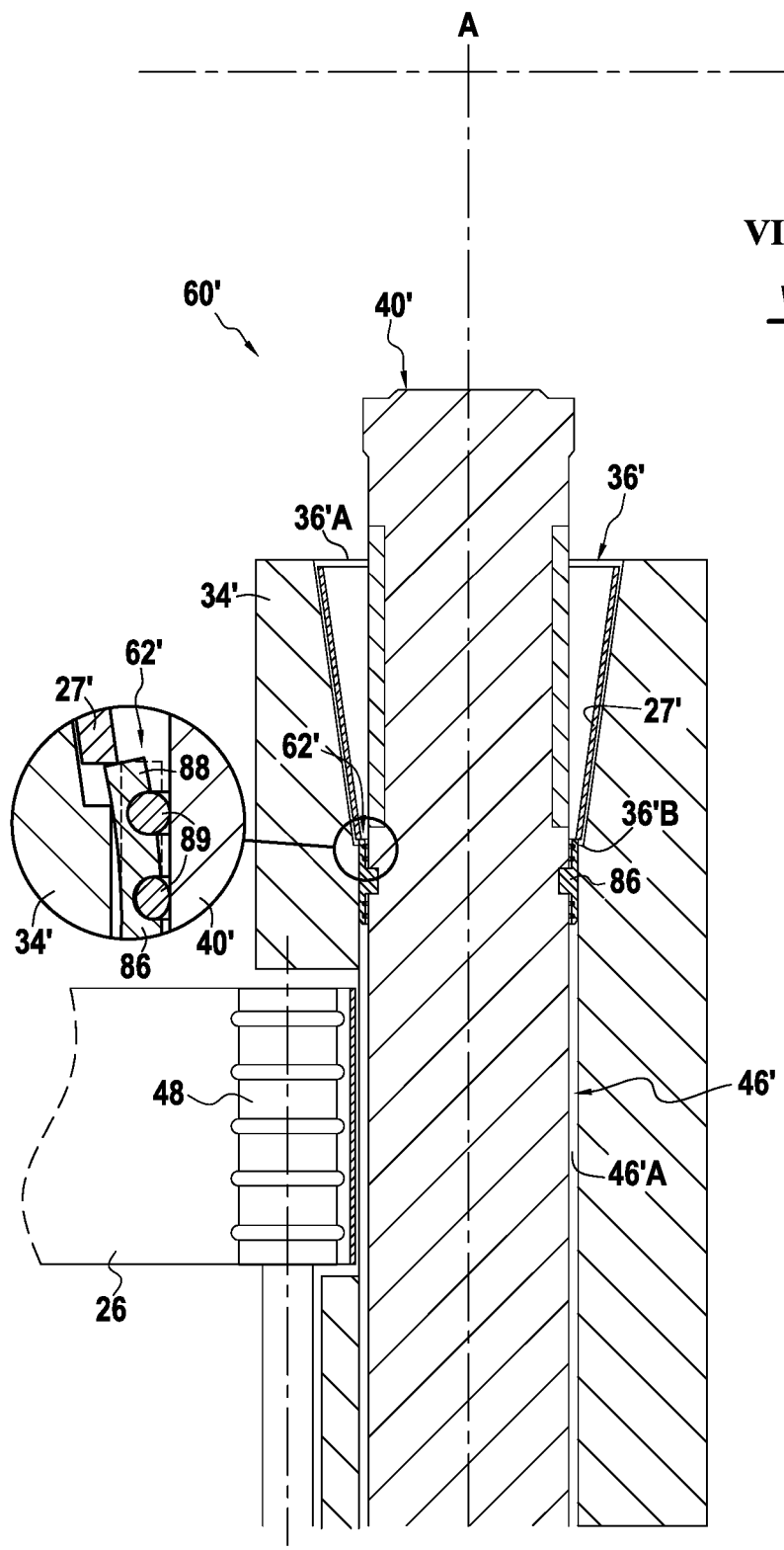
FIG. 5 is a view corresponding to FIG. 4D, for a variant of the forming and wrap-around labeling assembly.
Figure 6:
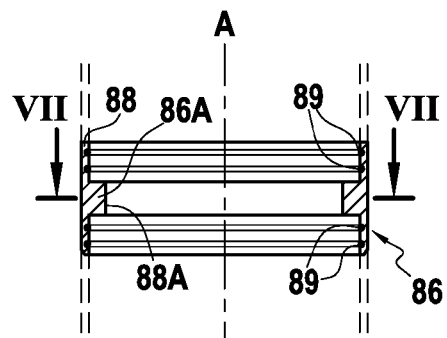
FIG. 6 is a detail view of the device of FIG. 5.
Figure 7:
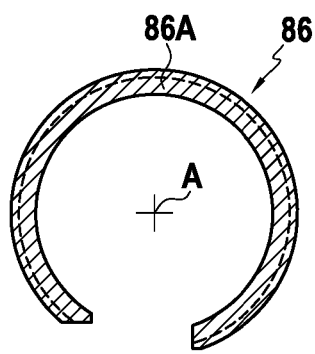
FIG. 7 is a section view on the plane VII-VII of FIG. 6.

With reference to FIGS. 5 to 7, a description is given below of a variant of the pusher member. FIG. 5 shows the forming and wrap-around labeling assembly 60' in the same situation as in FIG. 4, in which situation the block 34 has moved downwards to the low level of the positioning of the wrap-around label 27' inside the thermoforming chamber 36'. This figure diagrammatically shows, in particular, the mandrel 40', the thermoforming chamber 36', the looping chamber 46' and the mold block 34'. These elements are analogous to those shown in the preceding figures, subject to the differences described below.

In this example, the chamber 36' is frustoconical in overall shape, flaring from its end wall 36'B towards its upper opening 36'A. This shape is slightly different from the shape of the chamber 36 that is shown in the preceding figures and that has a cylindrical portion.

In the example, shown in FIG. 5, the pusher member is provided with an expandable ring 86 disposed in an annular groove 88 in the mandrel 40'. It can be seen that, when the mold block 34' is in the low position, an upper portion of the ring 86 is situated inside the thermoforming chamber 36'. This upper portion has expanded naturally to carry the lower edge of the wrap-around label 26A to the desired level in the chamber. As in the above-described variant, the mandrel 40' may optionally have a suction system (not shown here) serving to press the wrap-around label 27' as looped in the chamber 46' against said mandrel while the mold block 34' is being lowered.

FIGS. 6 and 7 show the shape of the expandable ring 86 in more detail. FIG. 6 shows its shape when it is constrained by the side wall of the looping chamber 46', e.g. in a situation corresponding to the situations of FIG. 4A, 4B, 4C or indeed 4E. It can be seen that, in this example, the expandable ring 86 has an inwardly projecting annular portion 86A engaged in an annular setback 88A of the groove 88. This makes it possible to hold the ring stationary axially relative to the groove. In addition, as can be seen in FIG. 7 the ring 86 is split, thereby enabling its diameter to increase or to decrease. In order to be resiliently urged in the direction in which it expands, the ring 86 co-operates with annular gaskets 89 made of a resilient material, and, in this example, disposed in the groove 88, on either side of the setback 88A. These gaskets are thus clamped between the inner periphery of the ring 86 and the end wall of the groove 88, and thus have a return spring effect urging the ring 86 in the direction in which it expands radially. Naturally, this is merely one example of an expandable ring. Thus, the ring 86 per se may be relatively flexible so that only its upper portion is deformed when, as the mold block 34' is being lowered, it comes into the thermoforming chamber 36', while its lower portion remains constrained by the wall of the looping chamber 46'. The ring 86 may also be made of or coated with a wear-resistant material so as to co-operate, without prematurely wearing, with the edge of the annular passageway 62' provided in the end wall of the chamber 36', during the upward and downward movements of the block 34. The radially outer edge of the annular passageway 62' may be ramp-shaped, beveled, or rounded, so as to make it easier for the ring 86 to return to the retracted position while the mold is going back up, thereby further minimizing the risks of wear.

Figure 8:
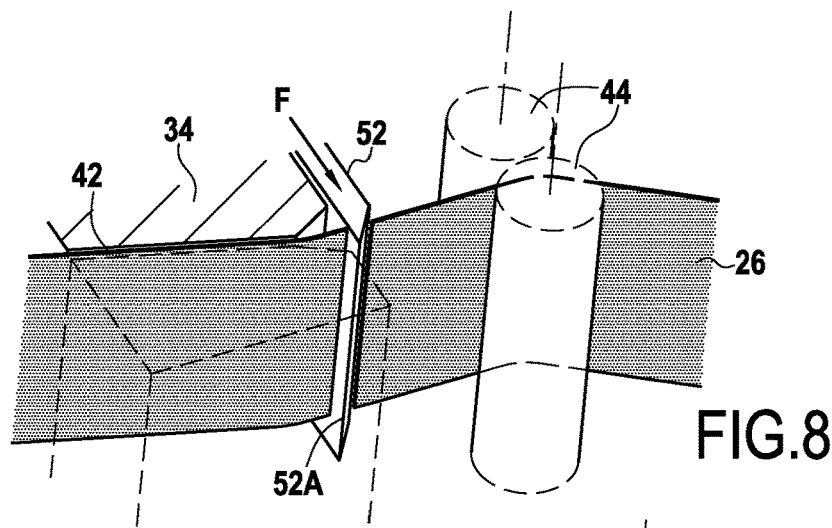
FIG. 8 is a diagrammatic perspective view seen looking along arrow VIII of FIG. 3B, showing a portion of the feed and cutting mechanisms for feeding and cutting a strip for forming a wrap-around label.

A description follows of FIG. 8, which is a diagrammatic perspective view seen looking along arrow VIII of FIG. 3B. This figure shows two drive rollers 44 that push the strip 26 into the slot 42 in the mold block 34 (the portion of the mold block that is situated in front of the slot is shown in dashed lines to make the drawing clearer). The blade 52 that has a sharp edge 52A serving to cut the strip once a segment of sufficient length has been inserted into the mold block 34 can also be seen. As indicated by arrow f in FIG. 3B, said blade moves in translation against the wall of the block 34 that acts as a cutting backing tool, for cutting the strip.

In the example shown in FIGS. 4A to 4E, the wrap-around label 27 is disposed in a region of the thermoforming chamber 36 that is cylindrical, i.e. a region in which the diametrical dimensions are constant over the height. Conversely, in the example, shown in FIG. 5, the thermoforming chamber 36' is frustoconical, i.e. its diametrical dimensions vary in particular in the region in which the strip is to be disposed.

Figure 9:
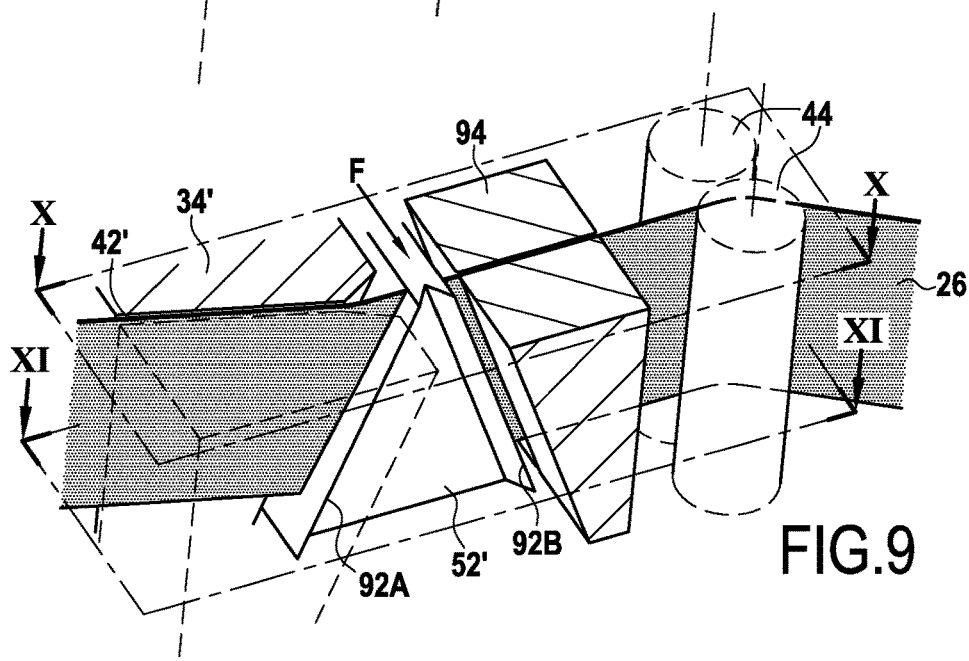
FIG. 9 is a view analogous to FIG. 8, but showing a variant embodiment.
Figure 10:
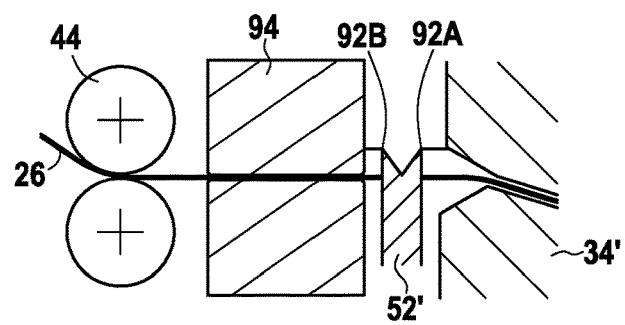
FIGS. 10 and 11 are section views on respective ones of the planes X-X and XI-XI of FIG. 9.
Figure 11:
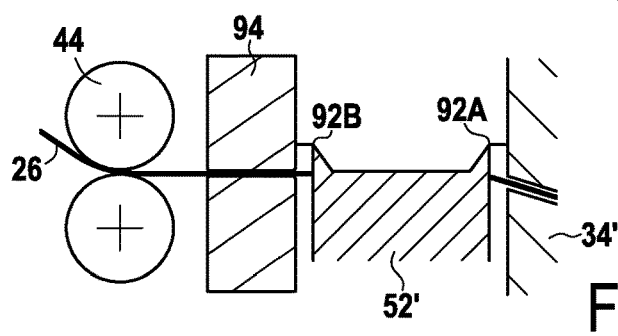

FIGS. 9 to 11 diagrammatically show the way in which the strip cutting tool may be made in this example. FIG. 9 corresponds to FIG. 8, and the strip 26, the rollers 44, and the wall of the mold block 34' can be recognized. However, insofar as the wrap-around label is to be disposed around a frustoconical portion of a container, its diametrical dimensions are smaller in the lower region than in the upper region.

Naturally, as in the example shown in FIG. 8, the strip could be cut parallel to the drive axes of the rollers 44, i.e. vertically, before it is looped until its two vertical edges overlap while forming additional thickness where they overlap.

When the wrap-around label is put in place in a flared portion of a chamber, e.g. a frustoconical portion, then, if the strip were cut straight, a wider overlap would be obtained in the lower portion than in the upper portion.

To avoid this, it is proposed to cut the strips on a slant, by using a blade 52' that, seen in a vertical plane perpendicular to the direction of back-and-forth movement of the blade, as in FIG. 9, has a triangular shape. In FIG. 9, a first sharp edge 92A of the blade 52' defines the trailing edge of the wrap-around label that is being looped in the looping chamber, while the second edge 92B of the blade defines the leading edge of the following wrap-around label. In this example, both of the sharp edges are rectilinear and inclined in such a manner as to define an isosceles triangle. Naturally, the slope of the sharp edges 92A and 92B is defined as a function of the degree of flaring of that portion of the chamber in which the wrap-around label is to be disposed. In particular, this angle may correspond to half of the angle of the truncated cone defined by the chamber.

For the sharp edge 92A, the block 34' against the wall of which that sharp edge moves during the cutting may act as a backing tool. For the other sharp edge 92B, an additional backing tool 94 is disposed on the other side of the blade 52'. By comparing FIGS. 10 and 11, it can be seen that the thickness of the blade 52' and the spacing between the backing tool 94 and the opposite wall of the block 34' vary over the height.

The invention claimed is:

1. A device for manufacturing containers provided with decorative wrap-around labels, the device comprising at least one forming and wrap-around labeling assembly suitable for taking up an active configuration in which said assembly has a forming chamber and a looping chamber, said chambers being in axial alignment and communicating with each other via an annular passageway provided through an end wall of the forming chamber, said end wall being opposite from a forming opening in the forming chamber, the forming and wrap-around labeling assembly further being provided with a pusher member configured to push a wrap-around label that is looped in the looping chamber into the forming chamber through an annular passageway, wherein at least one portion of the forming chamber flares going away from the end wall towards the forming opening and the pusher member is configured to expand radially while pushing the wrap-around label into said flared portion of the forming chamber.

2. A device according to claim 1, wherein the pusher member has a pushing surface that extends transversely to the axis of alignment of the forming chamber and of the looping chamber, said pushing surface being configured to carry an edge of the wrap-around label so as to push the wrap-around label into the forming chamber.

3. A device according to claim 1, wherein the pusher member is continuously urged in radial expansion, and wherein, when the forming and wrap-around labeling assembly is in the active configuration, said pusher member is constrained in radial compression by a side wall of the looping chamber against said radial expansion.

4. A device according to claim 1, wherein the forming and wrap-around labeling assembly further comprises a shaping core that carries the pusher member and that, in the active configuration, co-operates with a facing wall of the looping chamber facing said shaping core to define an annular looping space, the shaping core and a side wall of the forming chamber being suitable for being moved axially relative to each other so as to push the wrap-around label into the forming chamber.

5. A device according to claim 1, wherein the pusher member comprises an expandable ring.

6. A device according to claim 5, wherein the expandable ring comprises a split ring.

7. A device according to claim 1, wherein the pusher member comprises a plurality of pusher fingers.

8. A device according to claim 7, wherein the pusher fingers are carried by a common support while being suitable for moving radially relative to said common support.

9. A device according to claim 8, wherein the pusher fingers are mounted to pivot on the common support.

10. A device according to claim 7, comprising springs urging the pusher fingers radially outwards.

11. A device according to a claim 4, wherein the pusher member comprises a plurality of pusher fingers carried by the shaping core while being suitable for moving radially relative to said shaping core.

12. A device according to claim 1, wherein at least one of the pusher member and the annular passageway has a retractor ramp that, when the pusher member comes to co-operate with a radially outer edge of said annular passageway while the pusher member and a wall of the forming chamber are moving relative to each other in the direction opposite from the direction in which the wrap-around label is pushed into the forming chamber, is suitable for urging said pusher member in the direction opposite from the direction in which said pusher member expands.

* * * * *